Patented Sept. 22, 1931

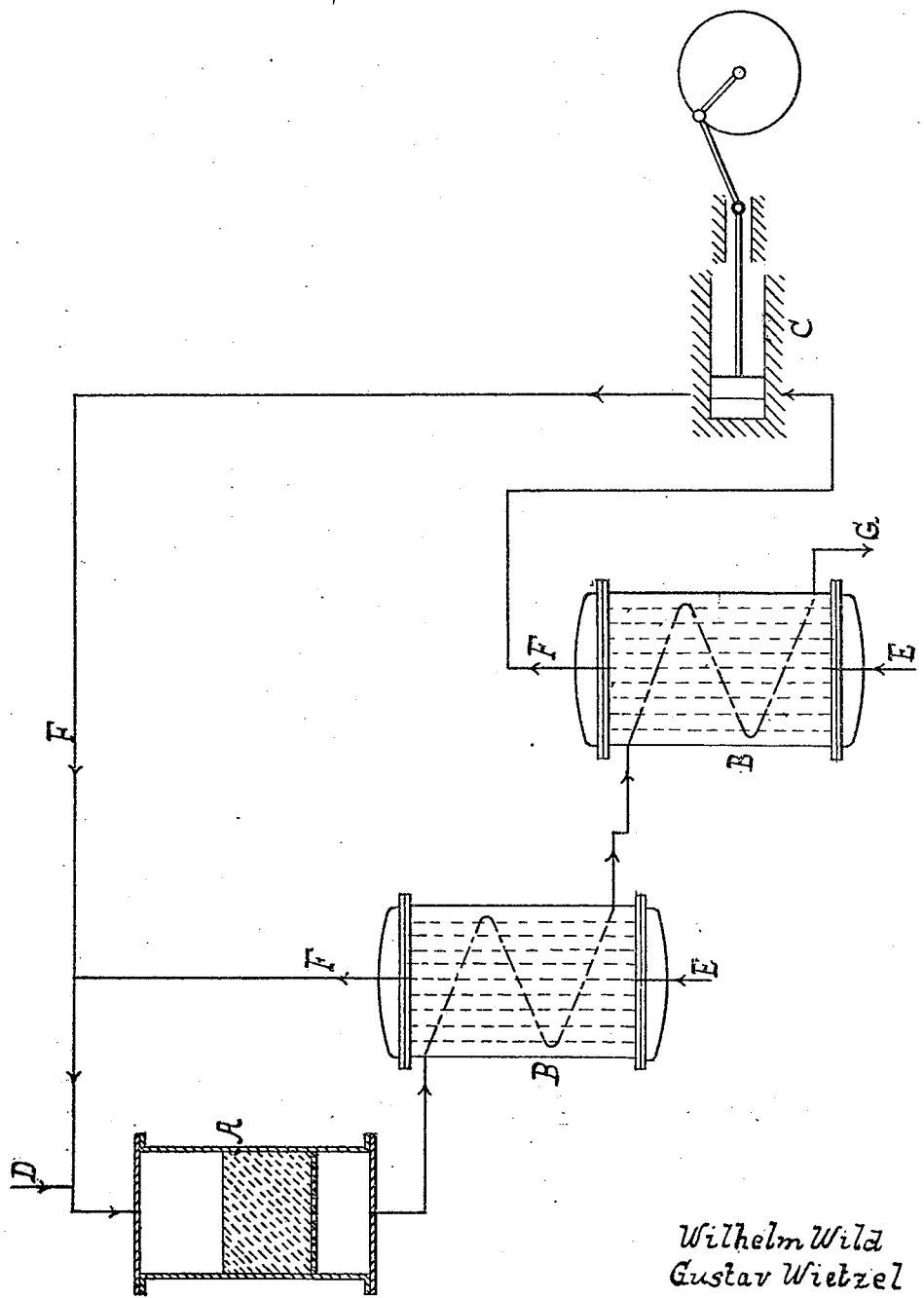

1,823,923

UNITED STATES PATENT OFFICE

WILHELM WILD AND GUSTAV WIETZEL, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF STEAM IN THE MANUFACTURE OF PHOSPHORUS ACIDS FROM PHOSPHORUS AND STEAM

Application filed November 29, 1926, Serial No. 151,598, and in Germany December 3, 1925.

In the preparation of phosphorus acids and hydrogen from phosphorus and steam large quantities of steam are required.

We have now found that a large proportion of the steam so required can be produced by effecting the condensation of the resulting phosphorus acids with the aid of a water-operated cooler or condenser in which the reaction gases do not come in direct contact with the cooling water, maintained at a temperature of 100° C. or higher, which at the same time serves as a generator for steam of atmospheric or higher pressure. The expressions "cooler" or "condenser" when used in the following description and the term "indirect heat exchange relation with water" as used in the appended claims only refer to such coolers or condensers in which direct contact of the gases leaving the reaction vessel with the cooling water is avoided. The materials which may preferably be used for the walls of such a condenser are tin bronze, aluminum bronze, ferro-silicon or the like.

Additional quantities of steam needed for the process can be produced by passing the mixture of excess steam and hydrogen issuing from the said condenser through a second water-operated cooler or condenser which is maintained at a temperature below 100° C. and operates as a steam-generating apparatus under a pressure lower than that of the atmosphere. The steam generated in this apparatus is then compressed to the pressure requisite for the interaction of phosphorus and steam. During this compression the steam becomes superheated, which is advantageous in the reaction with the phosphorus. Occasionally, for example when cheap electrical energy for compressing and superheating the steam generated under a pressure lower than that of the atmosphere is available, it may be advisable to omit the first stage entirely and pass the reaction mixture directly through the condenser maintained at a temperature below 100° C.

According to this invention considerable amounts of heat are recovered and utilized for the production of steam. Not only is the sensible heat contained in the hot gases leaving the reaction chamber utilized, but also the heat of the chemical combination of the water vapour with phosphorus pentoxide according to the equation $P_2O_5+3H_2O=2H_3PO_4$ which takes place above 100° C., also the heat of condensation of the water vapor required therefor and of the phosphorus pentoxide.

The following example will further illustrate how this invention may be carried out in practice, but the invention is not limited to this example. The parts are by weight.

A mixture of 166 parts of phosphorous vapor and 1080 parts of steam is heated to 360° C. and passed over a catalyst suitable for the oxidation of phosphorus to phosphorous pentoxide; in this reaction approximately 2 cubic metres of hydrogen are disengaged for each kilogram of phosphorus. The gases leaving the reaction vessel with a temperature of about 650° C. are passed through a tube boiler made of a copper-aluminium-iron alloy, in which boiler orthophosphoric acid is condensed and simultaneously about 700 parts of steam of a pressure of 1.5 atmospheres, i. e. about 70 per cent of the steam required for the reaction are generated.

The remaining mixture of hydrogen and water vapor is passed through another condenser, in which the water vapor is condensed. The hydrogen leaving this condenser may be employed for other purposes.

The second condenser may also be employed as a boiler for the production of steam of 0.3 atmosphere pressure. By compressing the steam so obtained to about 1.2 atmospheres, it is superheated and may then also be employed for the reaction with phosphorus.

The accompanying diagrammatic drawing shows an apparatus suitable for carrying out the process here described. A is a contact vessel containing a catalyst suitable for the reaction. Phosphorous vapors are introduced through the tube D. Two water-operated tube condensors B are shown, into which cooling water is introduced at E, the steam therein generated being taken off through tubings F and admitted thereby into the reaction vessel A. The low pressure steam generated in the second condenser B is compressed by a compressor C before being introduced into the pipings F. The phosphoric acid and hydrogen produced in the process are delivered at G.

In the above-described manner large proportions of the steam required for the conversion of phosphorus into phosphorous acids by means of steam are produced in the process itself by utilizing the heat disengaged in the process.

What we claim is:

1. In the production of acids of phosphorus and hydrogen by the interaction of phosphorus and steam, the step of passing the hot gases issuing from the said interaction into indirect heat exchange relation with water maintained at a temperature of at least 100° C., thereby separating the acids of phosphorus and simultaneously producing essential proportions of the steam needed in the reaction of at least atmospheric pressure from the water contained in the said condenser, and allowing the steam thus produced to interact with further amounts of phosphorus.

2. In the production of acids of phosphorus and hydrogen by the interaction of phosphorus and steam, the step of passing the hot gases issuing from the said interaction into indirect heat exchange relation with water maintained at a temperature of at least 100° C., thereby separating the acids of phosphorus and simultaneously producing essential proportions of the steam needed in the reaction of at least atmospheric pressure from the water contained in said condenser, thereupon passing the gases issuing from the first condenser into indirect heat exchange relation with water maintained at a temperature below 100° C., compressing the steam thus produced, and allowing the steam thus produced to interact with further amounts of phosphorus.

In testimony whereof we have hereunto set our hands.

WILHELM WILD.
GUSTAV WIETZEL.